United States Patent

[11] 3,569,822

[72] Inventors Frank W. Neilson;
  Otmar M. Stuetzer, Albuquerque, N. Mex.
[21] Appl. No. 815,429
[22] Filed Apr. 11, 1969
[45] Patented Mar. 9, 1971
[73] Assignee The United States of America as represented by the United States Atomic Energy Commission

[54] ANTIFERROELECTRIC VOLTAGE REGULATION
3 Claims, 11 Drawing Figs.
[52] U.S. Cl. .................................................. 323/93, 310/8, 310/8.1, 310/9.5
[51] Int. Cl. .................................................. H01g 7/06
[50] Field of Search ........................................... 310/8, 8.1, 9.5; 323/93, 94, (Inquired)

[56] References Cited
UNITED STATES PATENTS
2,724,171  11/1955  Wallace ........................  310/8.0X
3,032,706  5/1962  Wieder .........................  310/9.5X
3,219,583  11/1965  Cook, Jr. et al. ..............  310/8.0X
3,311,817  3/1967  Glanc ..........................  310/9.5X
3,365,400  1/1968  Pulvari ........................  310/8.0X
3,404,296  10/1968  Jaffe et al. ...................  310/8.0

OTHER REFERENCES
Piezoelectric and Ferroelectric Energy Conversion by Don Berlincourt, presented at IEEE Conference May, 1967.

Primary Examiner—Milton O. Hirshfield
Assistant Examiner—Mark O. Budd
Attorney—Roland A. Anderson ABSTRACT: Regulating of voltage from a power source to a load is achievable by disposing an antiferroelectric ceramic element between electrodes, the antiferroelectric element having a field-induced antiferroelectric to ferroelectric transition at desired voltage regulation level.

INVENTORS
FRANK W. NEILSON
OTMAR M. STUETZER

INVENTORS
FRANK W. NEILSON
OTMAR M. STUETZER

3,569,822

ANTIFERROELECTRIC VOLTAGE REGULATION

BACKGROUND OF THE INVENTION

Voltage regulating devices are extensively used in a wide range of applications in almost every type of industry from microminiaturized electronics to high electrical power uses. Conventional voltage regulating devices may include gas tubes, electron tubes, semiconductors, transformers, capacitors and combinations thereof depending on the size, weight, environment and electrical requirements of the particular application. These prior voltage regulating devices have been limited, in most cases, in their ability to withstand or handle high voltage in a small size or volume.

SUMMARY OF INVENTION

It is an object of this invention to provide voltage regulation, even for high voltages, in a device having small size and low weight.

It is a further object of this invention to provide voltage regulation in a novel device which may be used with alternating current, direct current and pulse power sources without modifications or additions.

It is a further object of this invention to provide voltage regulation in a novel device having high per volume energy storage.

Various other objects and advantages will appear from the following description of the invention, and the most novel features will be particularly pointed out hereinafter in connection with the appended claims.

The invention comprises voltage regulating with an antiferroelectric ceramic element having a field induced antiferroelectric to ferroelectric transition level at the desired voltage regulation level.

DESCRIPTION OF DRAWINGS

Various features of the present invention are illustrated in the accompanying drawings wherein.

DETAILED DESCRIPTION

Figure 1:
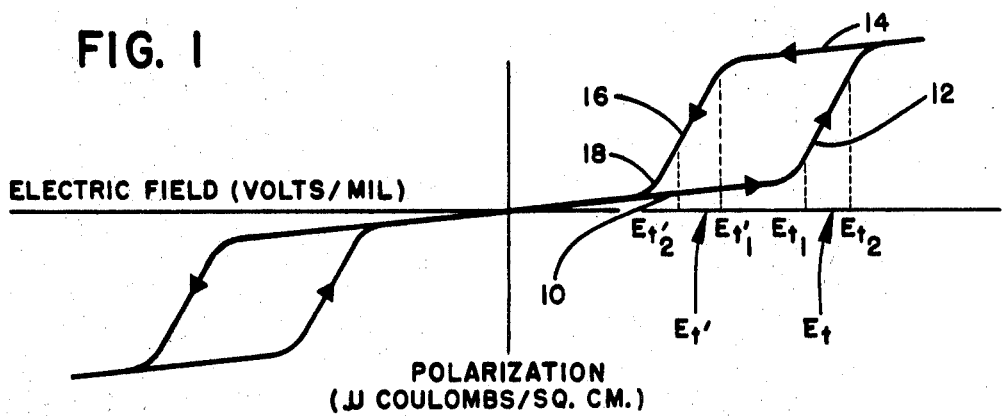
FIG. 1 is a polarization-electric field hysteresis diagram for a typical antiferroelectric material.

The present invention is particularly applicable to the class or group of materials which may be in an initial antiferroelectric state, that is a state with randomly oriented domains, but become ferroelectric and assume a polarization charge during the application of a bias field and then return to the antiferroelectric state when the bias field is decreased sufficiently or removed. Such materials typically exhibit this characteristic with either a positive or negative charge with a polarization-electric field hysteresis diagram or loop as shown by way of example in FIG. 1.

As the charge applied to the material is increased from zero in either the positive or negative direction, the material may exhibit a relatively large and rapidly increasing voltage such as along portion 10 to some area or point, designated herein as $E_{t1}$. Thereafter, the material may exhibit a relatively small and slowly increasing voltage per unit change in applied charge over a portion 12 of the hysteresis loop which may be linear or near linear in shape. After the assumed charge reaches an area or point designated as $E_{t2}$, increasing charge may cause the voltage to increase more rapidly in a nonlinear manner to and along the saturation portion 14 of the hysteresis loop. As long as charge continues to increase, voltage may rapidly increase per unit charge change along portion 14 to the dielectric breakdown level of the material. When the charge is decreased from some point along portion 14 below breakdown, voltage may rapidly decrease per unit charge change to the area or point designated $E_{t1}$. With continued decreasing charge, voltage may decrease linearly or near linearly along portion 16 at a slower rate per unit charge change to the area or point marked $E_{t2}$. From area $E_{t2}$, voltage may decrease rapidly to zero with decreasing charge along portion 18.

If in the charging portion of the hysteresis loop (e.g. portion 12), the assumed charge does not reach the area designated $E_{t2}$ or saturation before charge begins to decrease, the loop may generate a portion similar to and generally parallel with and below portion 14 to an intersection with portion 16. If the decreasing charge reverses and again increases it may return to portion 12 along a curve intermediate portion 10 and 14 and generally parallel thereto.

It has been found that materials exhibiting these antiferroelectric characteristics may be used to regulate voltages to a load within a narrow range between $E_{t1}$ and $E_{t2}$, designated generally in FIG. 1 as $E_t$, in those applications desiring efficient regulation. $E_t$ may be referred to as the antiferroelectric to ferroelectric transition level and defined in terms of volts per unit thickness. Additional regulation may be achieved between $E_{t1}'$ and $E_{t2}'$, such as at $E_t'$, and, where an application permits it, a certain amount of regulation may also be achieved over a range between both $E_t$ and $E_t'$. Since the area bounded by portions 10, 12, 14, 16 and 18 of the hysteresis loop represents stored energy or charge within the antiferroelectric material, it has been found that this latter type of voltage regulation over a range between $E_t$ and $E_t$ may return energy to the circuit and load as the material discharges, such as in single pulse or transient applications. Antiferroelectric materials may be used in a wide range of applications using one or more of these regulation and energy storage characteristics by proper selection of an appropriate material and operating environment.

Figure 2:
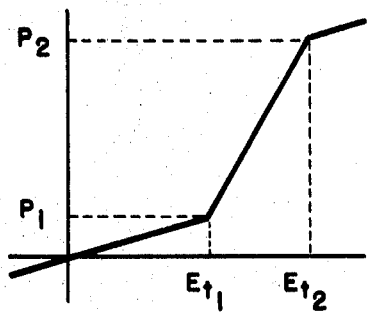
FIG. 2 is an idealized hysteresis diagram for some types of antiferroelectric voltage regulating devices.

For example, in an application which requires a relatively wide range of voltage regulation with little energy storage, an idealized hysteresis loop such as is shown in FIG. 2 may be desirable. With this hysteresis loop, where $E_{t1}=E_{t2}$, $E_{t2}=E_{t1}'$ and $E_t=E_t'$, regulation may be achieved over a wide range of charge between $P_1$ and $P_2$. Antiferroelectric materials may be found which exhibit characteristics very similar to this with only a narrow loop at room temperature such as $Pb_{0.94}La_{0.04}(Zr_{0.44}Sn_{0.4}Ti_{0.16})O_3$ ($E_t$=80 volts/mil).

Numerous ceramic compositions in either ceramic or single crystal form exhibit the above-described characteristics and may be used with this invention to perform the desired voltage regulation. Such compositions include solid solutions of lead zirconate-lead titanate, lead hafnate-lead titanate, lead zirconate-lead stannate-lead titanate, as well as others (including barium, calcium and/or strontium) and combinations thereof with various ranges of constituents depending on the particular solution or composition used. These solutions may be further modified to achieve one or more desired characteristics such as some useful hysteresis loop shape by additions of about 0.1 to 4.0 atom percents of one or more of the oxides of niobium, antimony, bismuth, tantalum, lanthanum, etc. A particularly useful composition in some wide temperature applications may be $Pb_{0.92}La_{0.02}Sr_{0.05}(Zr_{0.7-y}Sn_{0.3}Ti_y)O_3$ where $y$ ranges from about 0.14 to 0.16 and for applications above room temperature the compositions $Pb_{0.988}(Hf_{0.935}$ Ti$_{0.03}$ Sn$_{0.01}$ Nb$_{0.025}$) O$_3$ ($E_t = 50$ volt/mil), and Pb$_{0.99}$ (Zr$_{0.97}$ Ti$_{0.03}$) Nb$_{0.02}$ O$_3$ may be used.

Each of the above compositions or composition systems may be antiferroelectric over a certain range of temperatures for a given combination of constituents. Further, the particular shape of the antiferroelectric hysteresis loop may vary over a wide range again dependent on temperature and constituent amounts. For instance, $E_t$ may vary from about 50 volts per mil to the limit of the dielectric strength of the material, typically for the most useful materials from about 80 to 150 volts per mil. $E_t'$ may vary from just a few volts per mil to about 100 to 150 volts per mil below $E_t$. In many materials, the difference between $E_t'$ and $E_t$ is very temperature dependent. The charge accumulation between $E_{t1}$ and $E_{t2}$ may range typically from about 5 to 35 microcoulombs per square centimeter. Energy storage as high as about 1 joule per cubic centimeter or more may be achieved.

Figure 3:
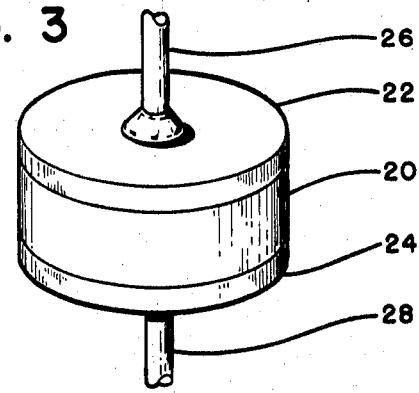
FIG. 3 is a perspective view of an antiferroelectric voltage regulating device.

An antiferroelectric voltage regulator may be formed, as illustrated in FIG. 3, by disposing an antiferroelectric element 20 between a pair of electrodes 22 and 24 with appropriate leads 26 and 28 fastened thereto in any convenient manner such as welding or soldering. Element 20 may have any desired disc, cylindrical, block or other conventional shape which combines ease of manufacture with ease of use. Electrodes 22 and 24 may be made of any conductive material such as copper, aluminum, silver, gold, or the like as a foil or plate suitably adhered to element 20 or directly fired, plated or evaporated thereon.

In designing and manufacturing a voltage regulator for a desired use, an antiferroelectric material may first be selected which exhibits a desired hysteresis loop characteristic, taking into consideration the temperature at which the regulator is to be used and the amount of and necessity for energy storage and/or a given difference between $E_t$ and $E_t'$. With a selected material, the desired thickness ($T$) of material may be determined to insure that the ratio of regulated voltage ($V_r$) to thickness $T$ falls along portion 12 of the hysteresis loop or somewhere between portion 12 and portion 16. With a given thickness of material, the cross-sectional area of the antiferroelectric may be selected to insure that the element is capable of accumulating sufficient charge without entering or approaching saturation.

Figure 4:
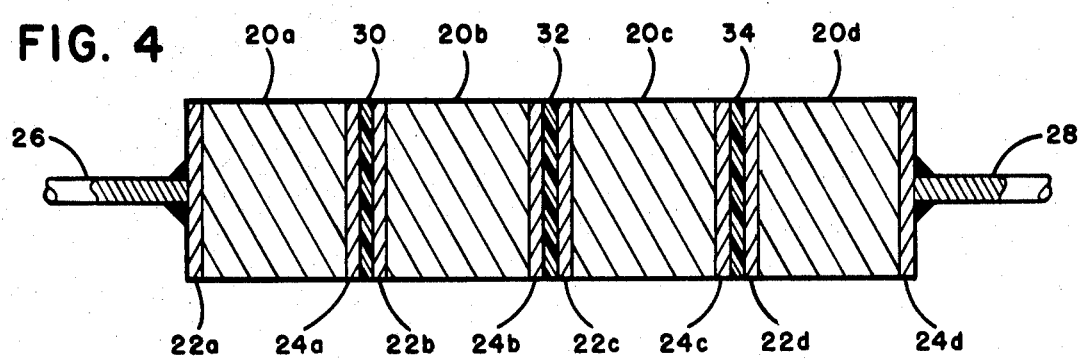
FIG. 4 is a cross-sectional side view of another embodiment of an antiferroelectric voltage regulating device.

It has been found that the internal strains within some materials may cause the antiferroelectric element to crack or break at some voltage regulating level and element thickness determined by the regulating level. Thus, for high voltage applications, it may be desirable to form the regulator from a plurality of separate axially aligned elements wherein the combined thickness of the element provides the necessary voltage regulating level. The sum of the individual element thicknesses provides the same regulating characteristics as a single element of the same thickness. FIG. 4 shows such a stacked or sandwiched type of voltage regulator having four antiferroelectric elements 20a, 20b, 20c, and 20d, each disposed between electrode pairs 22a—24a, 22b—24b, 22c—24c and 22d—24d and leads 26 and 28. The electrodes used between the individual elements may be any combination of conductors and/or conductive adhesives as desired. In the illustrated embodiment, the intermediate electrodes may be fastened together by commercially available conductive adhesives 30, 32 and 34, such as epoxies or other resins. The antiferroelectric elements may be separately formed into the required individual thickness and cross-sectional area, electroded and then stacked to form the complete regulator. In order to insure good element alignment, it may be desirable in some applications to machine or otherwise obtain the desired cross-sectional area after the elements are stacked. For convenience of manufacture, standardized elements having a preset thickness may be used for a wide range of voltage regulating levels by stacking a sufficient number of standardized elements to some point below the required total thickness and then stack a specially made element to the required voltage regulating level.

Figure 5:
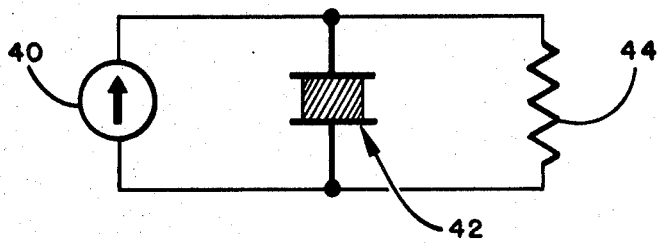
FIG. 5 is a simplified schematic circuit diagram of a voltage regulated circuit.

FIG. 5 illustrates a simplified schematic voltage regulator circuit including a power source 40 (shown as a current source), an antiferroelectric regulator 42 of the type shown in either FIG. 3 or FIG. 4 and a load 44. Regulator 42 may be selected as described above from for some power source 40 and load 44 operating characteristics to maintain some predetermined regulated voltage within some preselected range to load 44.

Figure 6A:
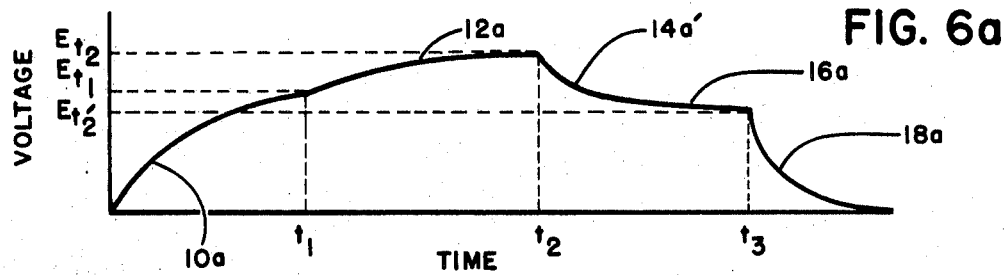
FIGS. 6a and 6b are operating characteristic curves for the devices of FIGS. 3 and 4.

Assuming that power source 40 generates and supplies a generally rectangular current pulse to the circuit and that the current pulse either terminates before the antiferroelectric charge accumulation reaches saturation (e.g. no higher than about $E_{t2}$) or the load 44 uses a charge low enough to prevent reaching saturation, the load voltage may follow the general voltage characteristic curve shown in FIG. 6a. The respective portions of the characteristic curve are labeled to correspond with the hysteresis loop portions of FIG. 1 except that the material never reaches portion 14 but instead returns on a portion below and generally parallel with portion 14 as described above. If the antiferroelectric material is driven into saturation, the voltage curve may appear as shown in FIG. 6b.

It may be seen by reference to FIG. 6a that the desired regulated voltage level may be selected over the voltage curve portion 12a or a combination of portions 12a, 14a and 16a depending on the particular antiferroelectric hysteresis loop and circuit requirements. Using the first portion, a very narrow range of voltage regulation may be achieved whereas with the combination of portions, a more extended range of regulation may be achieved.

Figure 7:
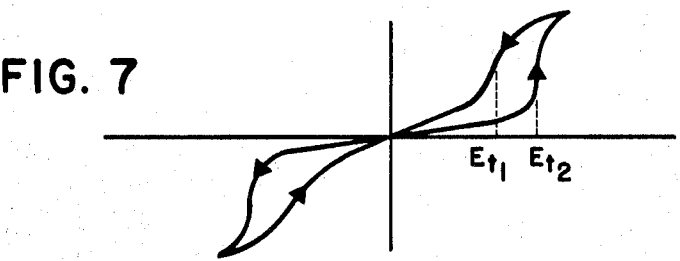
FIG. 7 is a polarization-electric field hysteresis diagram for certain antiferroelectric materials.
Figure 8:
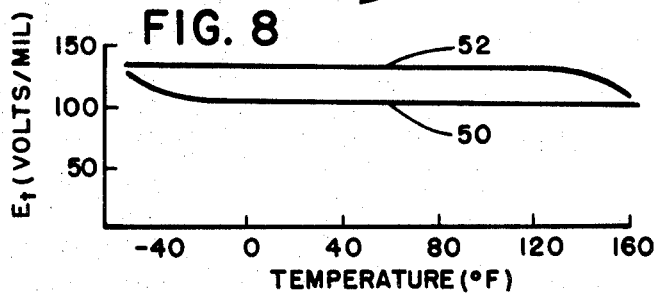
FIG. 8 is a temperature-voltage regulation characteristic curve for the materials of FIG. 7.

A particularly desirable composition system for applications requiring a generally constant $E_t$ over a wide range of temperatures may be the system described above of Pb$_{0.92}$ La$_{0.02}$ Sr$_{0.05}$ (Zr$_{0.7-y}$ Ti$_y$ Sn$_{0.3}$) O$_3$ where $y$ varies from 0.14 to 0.16 A typical hysteresis loop for this system and the temperature dependency $E_t$ is shown in FIG. 7 and FIG. 8. In FIG. 8, curve 50 is for the material where $y = 0.15$. Using the more temperature stable material with $y = 0.16$, curve 52, the material has an $E_t$ of about 95 to 140 volts per mil and a $P_2-P_1$ of about 15 microcoulombs per square centimeter with 10 percent voltage regulation over the temperature range of about $-65$ to $+165°$ F. $E_t'$ varies from about 0 volts per mil at $-65°$ F. to almost equal to $E_t$ at $+165°$ F.

Figure 6B:
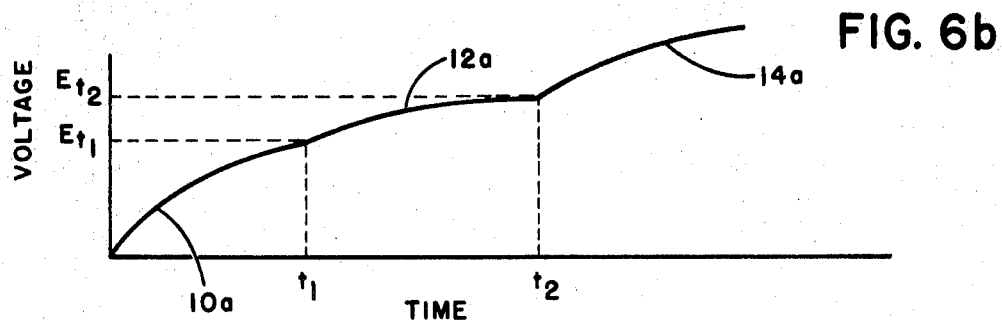

As can be seen from the antiferroelectric hysteresis loops of FIGS. 1, 2 and 7 and the voltage characteristic curves of FIGS. 6a and 6b, an antiferroelectric regulator may be used in many applications. Besides its use in voltage regulating of pulse power supplies described above, it may be used to absorb and smooth out transients in either direct or alternating current lines or systems by proper selection of element cross section and operating point on the hysteresis loop. The device may also be used as alternating current wave or pulse clippers such as in certain pulse or wave shapers.

Antiferroelectric materials may perform these functions over a wide range of regulating voltage levels, limited only at the low end by the smallest achievable thickness, in a simple, easily fabricated device of small size and low weight.

Figure 9:
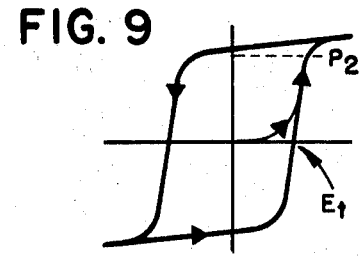
FIG. 9 is a polarization-electric field hysteresis diagram for a typical ferroelectric material.

FIG. 9 is a hysteresis loop for a typical ferroelectric material. Such a material may be used in some applications, however with certain inherent limitations. In pulse regulating applications, it may be used for single pulse since without thermal or other depoling, the material retains some remanent charge and thus at least limits the available regulation on subsequent pulses. Further, the energy storage capabilities and regulating voltage level ranges are considerably lower than for antiferroelectric materials and may require considerably larger elements to achieve the same levels of regulation.

The small size and weight of antiferroelectric voltage regulators and high voltage capabilities make them particularly useful regulators for explosive shock wave initiated piezoelectric and ferroelectric power supplies. Such power supplies are capable of generating a short term, very high voltage pulse for such uses as high intensity light sources, pulsed high temperature sources, electron guns, high energy arcs and pulsed ray or particle emitting tubes. Many of these uses place a high premium on size and weight and also require a voltage regulator inherently insensitive to changing load characteristics.

Figure 10:
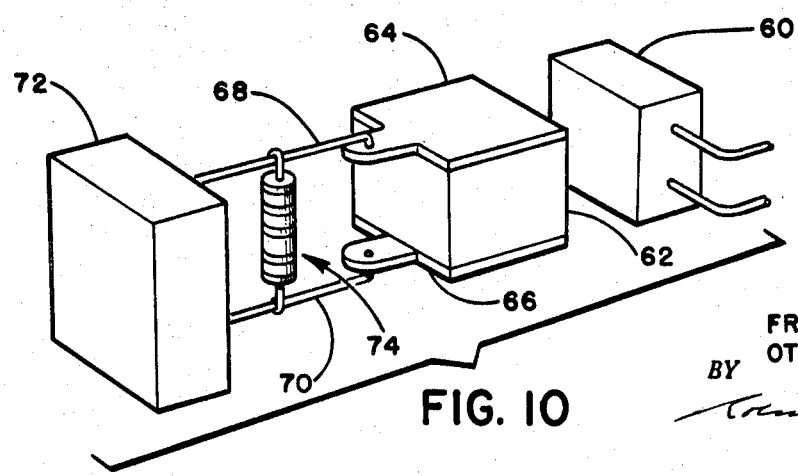
FIG. 10 is a perspective view of an antiferroelectric voltage regulated ferroelectric power source and load.

Such a power supply and load system is shown diagrammatically in FIG. 10. A conventional shock wave generator 60 may be shock wave coupled, such as with a suitable encapsulating material like a filled synthetic resin (not shown), to a suitable piezoelectric or ferroelectric transducer 62. Transducer 62 may include a pair of electrodes 64 and 66 or in some cases include more than one element with electrodes connected in series or parallel to achieve a desired voltage and/or current pulse. The output electrodes, in this case electrodes 64 and 66, may be any conventional load including those identified above. An antiferroelectric voltage regulator 74, similar to that shown in FIG. 4, may be connected parallel with load 72 and transducer 62.

Conventional piezoelectric or ferroelectric power supplies may be capable of generating electrical pulses having voltages from a very few volts to about 160,000 volts or more depending on thickness and area of the ferroelectric or piezoelectric, temperature and shock characteristics. For example, a typical ferroelectric power supply capable of generating a 140,000 volt pulse may have ferroelectric elements with a combined volume of about 0.16 cubic inches with a weight of about 0.7 pound.

By proper selection of antiferroelectric material and thickness and cross-sectional dimensions thereof, voltage regulator 74 may regulate these voltage outputs over some desired voltage level and time period to load 72. For example, using an antiferroelectric material as described above with respect to FIG. 7 and FIG. 8 (curve 52) and formed into four stacked elements, each element being a cylinder 0.25 inch in diameter and 0.205 inch long (total weight of about 0.7 pound), a regulated voltage of about 100 kilovolts ± 5 kilovolts may be maintained for at least the duration of the output pulse generated by transducer 62 for a transducer having an unregulated output as described above.

It will be understood that various changes in the details, materials and arrangements of the parts, which have been herein described and illustrated in order to explain the nature of the invention, may be made by those skilled in the art within the principles and scope of the invention as expressed in the appended claims.

We claim:

1. A method for providing regulation at a voltage level from a power source to a load comprising selecting an antiferroelectric material having a field induced antiferroelectric to ferroelectric transition and a ferroelectric to antiferroelectric transition with a desired hysteresis loop characteristic, determining the thickness of said material needed for providing said transitions at said regulated voltage level, providing an antiferroelectric element of said material with said thickness and having cross-sectional area to accumulate charge at said regulated voltage level, connecting said element intermediate a pair of electrodes in parallel with said power source and load, and applying voltages at said transitions to said element from said power source.

2. In combination with a pulsed high voltage power source for regulating the voltage thereof to a load, a voltage regulator comprising first and second electrodes, a plurality of antiferroelectric ceramic elements electrically interconnected and sandwiched in series between said electrodes, each of said antiferroelectric ceramic elements having a field induced antiferroelectric to ferroelectric transition and a field induced ferroelectric to antiferroelectric transition at the same field levels determined by the hysteresis loop of said antiferroelectric ceramic elements with a total thickness of all elements preselected to produce said transitions near the regulated voltage level, and means for connecting said elements and electrodes in parallel with said power source and load.

3. The combination of claim 2 wherein said plurality of antiferroelectric elements are interconnected by additional electrodes and said additional electrodes are adhesively secured together.